United States Patent Office 3,341,478
Patented Sept. 12, 1967

3,341,478
POLYMERIC PHOSPHORANES, ARSANES AND STIBANES AND PROCESS FOR MAKING THE SAME
Robert M. Washburn and Roger A. Baldwin, Whittier, Calif., assignors to American Potash & Chemical Corporation, Los Angeles, Calif., a corporation of Delaware
No Drawing. Application Jan. 11, 1963, Ser. No. 268,425, now Patent No. 3,311,646, dated Mar. 28, 1967, which is a division of application Ser. No. 149,887, Nov. 3, 1961, now Patent No. 3,112,331, dated Nov. 26, 1963. Divided and this application Aug. 1, 1966, Ser. No. 574,849
6 Claims. (Cl. 260—2)

ABSTRACT OF THE DISCLOSURE

Polymer phosphoranes, arsanes and stibanes and process for preparing the same by reaction of compounds of the type $R_{4-n}M(N_3)_n$ with compounds of the type R'R"Y—L—YR'R" wherein M is silicon, germanium or tin, and Y is phosphorous, arsenic or antimony.

This application is a division of application Serial No. 268,425, filed January 11, 1963, now U.S. Patent No. 3,311,646, issued March 28, 1967, which in turn is a division of application Serial No. 149,887, filed November 3, 1961, now U.S. Patent No. 3,112,331, issued November 26, 1963.

The present invention relates to novel phosphorus, arsenic and antimony compounds and to processes for preparing the same.

Broadly, the novel compounds of this invention may be classed as monomeric and polymeric phosphoranes, arsanes, and stibanes and can be represented by the general Formulae I–VII, set forth below. The monomeric phosphoranes, arsanes, and stibanes are represented by the Formulae I–III and the polymeric phosphoranes, arsanes, and stibanes are represented by the Formulae IV–VII.

The first class of monomeric phosphoranes, arsanes, and stibanes can be represented by the general Formula I.

$$R_{4-n}M(N=YR'R''R''')_n \quad (I)$$

wherein R is selected from the group consisting of aryl, halogen, alkoxy, aryloxy, amino, alkylthio, arylthio, and azide groups; M is a metal selected from the group consisting of silicon, germanium, and tin; Y is selected from the group consisting of phosphorus, arsenic and antimony; R', R", and R''' are selected from at least one of the group consisting of aryl, alkyl, alkoxy, aryloxy, amino, alkylthio and arylthio groups; and n is a whole number of from 1 to 4.

These compounds may be prepared by reacting one mole of (a) a compound having the formula $R_{4-n}M(N_3)_n$ wherein R is selected from the group consisting of aryl, alkyl, halogen, alkoxy, aryloxy, amino, alkylthio and arylthio groups M is a metal selected from the group consisting of silicon, germanium, and tin; and n is a whole number of from 1 to 4; with from 1 to 4 moles of (b) a compound having the formula YR'R"R''' wherein Y is selected from the group consisting of phosphorus, arsenic, and antimony; and R', R" and R''' are selected from at least one of the group consisting of aryl, alkyl, alkoxy, aryloxy, amino, alkylthio, and arylthio groups.

Compound (a) defined hereinabove is a metalloid azide, the preparation of which is disclosed fully in co-pending application Serial No. 149,885, filed November 3, 1961, now U.S. Patent No. 3,232,958, which application is assigned to the same assignee as the present invention.

Briefly, said compound (a) may be prepared, as described in said co-pending application, by reacting one mole of a compound having the formula $R_{4-n}MX_n$ wherein R is selected from the group consisting of aryl, alkyl, alkoxy, aryloxy, amino, alkylthio, and arylthio groups; M is a metal selected from the group consisting of silicon, germanium, and tin; X is an halogen atom; and n is a whole number from 1 to 4; with from one to four moles of a compound having the formula $M'N_3$ wherein M' is a metal selected from the group consisting of alkali metals and alkaline earth metals.

In carrying out the process of this invention to produce the novel phosphoranes, arsanes and stibanes, it has been found that for each one mole of compound (a) there must be employed from one to four moles of compound (b). The reaction must be carried out under anhydrous conditions in order to prevent the hydrolysis of the metalloid azides (a). In addition, to prevent oxidation of some of the phosphines, stibines, and arsines (b), it is necessary to preform the reaction in the absence of air. These two requirements can be met by carrying out the reaction in an inert atmosphere or in a vacuum.

In the formulae above it is indicated that R, R', R", and R''' are selected from a number of listed chemical groups. Examples of suitable radicals falling within these groups include:

Aryl: $C_6H_5$—; o, m, and p-Cl—$C_6H_4$—; o, m, and p-$CH_3$—$C_6H_4$—; o, m, and p-$(CH_3)_2N$—$C_6H_4$—; o, m, and p-$C_6H_5$—$C_6H_4$—; o, m, and p-$CH_3O$—$C_6H_4$—; o, m, and p-F—$C_6H_4$—; o, m, and p-Br—$C_6H_4$—; o, m, and p-I—$C_6H_4$—; o, m, and p-$NO_2$—$C_6H_4$—; o, m, and p-$C_6H_5O$—$C_6H_4$—; $\alpha$-$C_{10}H_7$—; $\beta$-$C_{10}H_7$—; and the like;

Alkyl: $CH_3$—; $C_2H_5$—; i-$C_3H_7$—; n-$C_3H_7$—; n-$C_4H_9$—; i-$C_4H_9$—; s-$C_4H_9$—; $CH_3OCH_2CH_2$—;

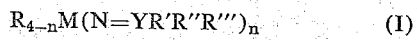

Cl—$CH_2CH_2CH_2$—; $C_6H_5CH_2$—; $C_6H_5CH_2CH_2$—; and the like;

Alkoxy: $CH_3O$—; $C_2H_5O$—; $C_3H_7O$—; $C_4H_9O$—;

$CH_3OCH_2CH_2O$—

Aryloxy: $C_6H_5O$—; o, m, and p-$CH_3$—$C_6H_4O$—; o, m, and p-F—$C_6H_4O$—; o, m, and p-Cl—$C_6H_4O$—; o, m, and p-Br—$C_6H_4O$—; o, m, and p-I—$C_6H_4O$—; o, m, and p-$(CH_3)_2N$—$C_6H_4O$—; o, m, and p-$C_6H_5$—$C_6H_4O$—; o, m, and p-$CH_3O$—$C_6H_4$—; o, m, and p-$C_6H_5O$—; o, m, and p-$NO_2$—$C_6H_4O$—; and the like;

Amino: $(CH_3)_2N$—; $(C_2H_5)_2N$—; $C_6H_5NCH_3$—; and the like;

Alkylthio: $CH_3S$—; $C_2H_5S$—; $C_3H_7S$—;

$C_2H_5SCH_2CH_2S$— and the like;

Arylthio: $C_6H_5S$—; o, m, and p-$CH_3$—$C_6H_4S$—; and the like.

Some examples of suitable metalloid azides (a) include triphenylazidosilane, diphenyldiazidogermane, phenyltriazidostannane, $\alpha$-naphthyldimethylazidostannane, p-methoxyphenylethyldiazidogermane, tri-n-butylazidosilane, phenyldiphenylthioazidogermane, bis(dimethylamino)-diazidosilane, m-phenoxyphenyltriazidogermane, o-chlorophenyltriazidosilane, $\alpha$-naphthyltriazidogermane and the like.

Some examples of suitable (b) compounds, namely, the phosphines, arsines, and stibines, include triphenylphosphine, phenyldimethylphosphine, tri-n-butylphosphine, trimethylphosphite, tri-(p-tolyl)phosphine, di(o-chlorophenyl)methylphosphine, $\alpha$-naphthyldimethylarsine, trimethylarsine, phenyldiethylarsine, di(m-phenoxyphenyl)n-butylarsine, triphenylstibine, triethylstibine, $\alpha$-naphthyldimethylstibine, tris(dimethylamino)phosphine, and the like.

The phosphoranes, arsanes, and stibanes of this invention can be prepared in a variety of solvents, such as pyridine, acetonitrile, triethylamine, di-n-butyl ether, benzene, toluene, dimethylformamide, and the like. The reaction temperature can range from −20° C. to 150° C. depending upon the choice of solvent and chemical and physical properties of the reactants. The reaction time, therefore, varies from a few hours to several days.

Although the general process for the preparation of the novel phosphoranes, arsanes, and stibanes of this invention involves the reaction of an azide group which is bonded to a silicon, germanium, or tin atom with a phosphine, arsine, or stibine, there are three important process variations which can be used. The use of any one particular process will depend upon the availability, stability, ease of handling, physical properties and the like of the reactants. If, for example, pure silicon, germanium, or tin azide is available, then it is convenient to react the pure azide with a phosphine, arsine, or stibine. However, if a pure azide has to be prepared as an intermediate for the preparation of a desired phosphorane, arsane, or stibane, then an in situ process can be used which obviates the necessity of using a pure azide. The in situ process may involve prior formation of the desired azide without isolation and purification, followed by reaction with a phosphine, arsine, or stibine; or, the in situ process may involve simultaneous formation and reaction of the azide. These three different processes are illustrated in Examples I–III.

*Example I.*—One mole of diphenyldiazidosilane and two moles of triphenylphosphine are reacted in pyridine to liberate nitrogen and form diphenylsilyldi(imidotriphenylphosphorane), as shown in Equation 1.

$$(C_6H_5)_2Si(N_3)_2 + 2(C_6H_5)_3P \rightarrow$$
$$(C_6H_5)_2Si[N=P(C_6H_5)_3]_2 + 2N_2 \quad (1)$$

The phosphorane product is recovered as a white powder by evaporating the pyridine solvent.

*Example II.*—One mole of diphenyldichlorosilane and two moles of sodium azide react in pyridine solvent to yield a pyridine solution of diphenyldiazidosilane and a precipitate of sodium chloride. The reaction mixture is filtered in an anhydrous atmosphere to remove the sodium chloride. To the filtrate containing approximately one mole of diphenyldiazidosilane is added two moles of triphenylphosphine; nitrogen is liberated and diphenylsilyldi(imidotriphenylphosphorane) precipitates. The phosphorane product is recovered as a white powder.

*Example III.*—To a stirred mixture of two moles of sodium azide and one mole of triphenylphosphine in pyridine is added a solution of two moles of diphenyldichlorosilane at such a rate that nitrogen is liberated smoothly. The reaction occurs, as shown in Equation 2.

$$(C_6H_5)_2SiCl_2 + 2NaN_3 + (C_6H_5)_3P \rightarrow$$
$$(C_6H_5)_2Si[N=P(C_6H_5)_3]_2 + 2NaCl + 2N_2 \quad (2)$$

The same diphenylsilyldi(imidotriphenylphosphorane) obtained in Examples I and II is obtained by removal of the sodium chloride by filtration and evaporation of the solvent.

*Example IV.*—The interaction of equal molar quantities of triphenylazidosilane and triphenylphosphine in refluxing pyridine until the evolution of nitrogen is complete yields the desired triphenylsilylimidotriphenylphosphorane.

*Example V.*—When two moles of trimethylphosphite and one mole of di-n-butyldiazidogermane are reacted in toluene until the evolution of nitrogen is complete, di-n-butylgermanyl - bis(imidotrimethoxyphosphorane) is formed. Evaporation of the toluene yields the product.

*Example VI.*—In refluxing dimethylformamide, three moles of triphenylstibine react with phenyltriazidostannane to yield nitrogen and phenylstannyltris(imidotriphenylstibane).

*Example VII.*—Reaction of two moles of tri-n-butylarsine and one mole of di(p-methoxyphenyl)diazidosilane in acetonitrile until the evolution of nitrogen is complete yields di(p-methoxyphenyl)silylbis(imidotri-n-butylarsane).

*Example VIII.*—The reaction of equal molar amounts of triphenylazidostannane and tris(dimethylamino))phosphine results in the formation of nitrogen and the formation of triphenylstannylimidotris(dimethylamino)phosphorane.

In addition to the above described phosphoranes, arsanes, and stibanes, a second class of monomeric phosphoranes, arsanes, and stibanes can be prepared by reacting one mole of a difunctional phosphine, arsine, and stibine having the following general formula $$R'R''Y—L—YR'R''$$

where R and Y are as described hereinabove and L is selected from the group consisting of arylene and alkylene, with two moles of a group IV metalloid azide (a), defined in co-pending application Serial No. 149,885, filed November 3, 1961, now U.S. Patent No. 3,232,958, to yield phosphoranes, arsanes, and stibanes having the following generalized formula, $$R_3M—N=Y(R'R'')—L—Y(R'R'')=N—MR_3 \quad (II)$$

where R, M, L, and Y have the values defined hereinabove.

Suitable arylene and alkylene groups represented by L in the above formulae include 1,4-$C_6H_4$—; 1,3-$C_6H_4$—; 4,4'-$C_6H_4$—O—$C_6H_4$—; 3,3'-$C_6H_4$—C(CH$_3$)$_2$—$C_6H_4$—; 1,5-pentamethylene; 1,4-naphthylene; and the like.

The synthesis of representative compounds of this second class of monomeric difunctional phosphoranes, arsanes, and stibanes is illustrated in Examples IX–XIII.

*Example IX.*—Two moles of triphenylazidosilane react with one mole of 1,4-(CH$_3$)$_2$P—$C_6H_4$—P(CH$_3$)$_2$ in benzene at room temperature after 48 hrs. to yield nitrogen and $$(C_6H_5)_3Si—N=P(CH_3)_2C_6H_4P(CH_3)_2=N—Si(C_6H_5)_3$$

*Example X.*—The interaction of one mole of $$4,4'\text{-}(C_2H_5)_2As—C_6H_4C(CH_3)_2C_6H_4—As(C_2H_5)_2$$

with two moles of tri-n-butylazidogermane in refluxing pyridine gives nitrogen and $$4,4'\text{-}(n\text{-}C_4H_9)_3Ge—N=As(C_2H_5)_2C_6H_4C$$
$$(CH_3)_2C_6H_4As(C_2H_5)_2=N—Ge(n\text{-}C_4H_9)_3$$

*Example XI.*—Two moles of trimethylazidostannane and one mole of (CH$_3$)$_2$P(CH$_2$)$_5$P(CH$_3$)$_2$ react after a week in toluene to give $$(CH_3)_3Sn—N=P(CH_3)_2(CH_2)_5$$
$$P(CH_3)_2=N—Sn(CH_3)_3$$

and nitrogen.

*Example XII.*—Reaction of one mole of $$1,3\text{-}(C_6H_5)_2SbC_6H_4Sb(C_6H_5)_2$$

and two moles of triphenylazidogermane gives $$1,3\text{-}(C_6H_5)_3Ge—N=Sb(C_6H_5)_2$$
$$—C_6H_4Sb(C_6H_5)_2=N—Ge(C_6H_5)_3$$

and nitrogen.

*Example XIII.*—The interaction of one mole of $$4,4'\text{-}(CH_3)_2PC_6H_4—O—C_6H_4P(CH_3)_2$$

and two moles of triethylazidosilane in benzene for two days yields nitrogen and $$4,4'\text{-}(C_2H_5)_3Si—N=P(CH_3)_2$$
$$C_6H_4—O—C_6H_4P(CH_3)_2=NSi(C_2H_5)_3$$

A third class of monomeric phosphoranes, arsanes, and stibanes result from the interaction of (a) one mole of a group IV arylene or alkylene difunctional azide defined in co-pending application, Serial No. 149,885, filed November 3, 1961, now U.S. Patent No. 3,232,958, having the following generalized formula $$(N_3)_nR_{3-n}M-L-MR_{3-n}(N_3)_n$$

where M, R and L have the values defined previously, and n is a whole number of from 1 to 3, (b) with from 2 to 6 moles of a compound selected from the group consisting of phosphines, arsines, and stibines having the following generalized formula $$YR'R''R'''$$

where Y, R', R", and R'" have values as defined above, to yield phosphoranes, arsanes, and stibanes having the following generalized formula $$(R'R''R'''Y=N)_n-M(R)_{3-n}-L$$
$$-M(R)_{3-n}-(N=YR'R''R''')_n \quad (III)$$

where R', R", R'", R, Y, M, and L have values as defined in above definitions, and n is a whole number from 1 to 3.

The synthesis of this third class of monomeric phosphoranes, arsanes and stibanes is illustrated in Examples XIV-XIX.

*Example XIV.*—Two moles of triphenylphosphine are dissolved in boiling pyridine. To the boiling solution is added one mole of 1.5-di(dimethylazidosilano)-pentane at such a rate that nitrogen is evolved slowly.

$$(C_6H_5)_3P=N\underset{\underset{CH_3}{|}}{\overset{\overset{CH_3}{|}}{Si}}-C_5H_{10}-\underset{\underset{CH_3}{|}}{\overset{\overset{CH_3}{|}}{Si}}N=P(C_6H_5)_3$$

is obtained when the solvent is removed by distillation.

*Example XV.*—A mixture of two moles of triphenylphosphine and two moles of sodium azide are stirred and heated under reflux in pyridine. To the refluxing mixture is added one mole of 1,5-di(dimethylchlorosilano)pentane at such a rate that nitrogen is liberated smoothly. The reaction mixture is filtered and $$(C_6H_5)_3P=N-\underset{\underset{CH_3}{|}}{\overset{\overset{CH_3}{|}}{Si}}-C_5H_{10}-\underset{\underset{CH_3}{|}}{\overset{\overset{CH_3}{|}}{Si}}-N=P(C_6H_5)_3$$

is isolated by removing the solvent from the filtrate by distillation.

*Example XVI.*—A mixture of four moles triphenylarsine and four moles of sodium azide are heated under reflux in toluene. To the heated mixture is added a toluene solution of 1,4-di(phenyldichlorogermano)benzene at such a rate that nitrogen is liberated slowly. The reaction mixture is filtered and the solvent removed from the filtrate leaving $$[(C_6H_5)_3As=N]_2\underset{\underset{C_6H_5}{|}}{Ge}-C_6H_4-\underset{\underset{C_6H_5}{|}}{Ge}-[N=As(C_6H_5)_3]_2$$

*Example XVII.*—A mixture of six moles of trimethylphosphite and six moles of sodium azide are heated in pyridine. To the heated mixture is added 1,3-di(trichlorostanno)benzene at such a rate that nitrogen is liberated slowly. The reaction mixture is filtered and the solvent removed from the filtrate leaving $$[(CH_3O)_3P=N]_3Sn-C_6H_4-Sn[-N=P(OCH_3)_3]$$

*Example XVIII.*—A mixture of two moles of phenyldimethylstibine and two moles of sodium azide is heated in xylene. To the heated mixture is added one mole of 4,4'di(dimethylchlorosilano)diphenyl ether at such a rate that the slow evolution of nitrogen is maintained. After the reaction is complete, the reaction mixture is filtered and $$C_6H_5-\underset{\underset{CH_3}{|}}{\overset{\overset{CH_3}{|}}{Sb}}=N-\underset{\underset{CH_3}{|}}{\overset{\overset{CH_3}{|}}{Si}}-C_6H_4-O-C_6H_4-\underset{\underset{CH_3}{|}}{\overset{\overset{CH_3}{|}}{Si}}-N=\underset{\underset{CH_3}{|}}{\overset{\overset{CH_3}{|}}{Sb}}-C_6H_5$$

is isolated by evaporating the solvent from the filtrate.

*Example XIX.*—The reaction of four moles of tributylphosphine, four moles of sodium azide, and one mole of 1,3-bis(ethyldichlorosilano)benzene yields $$[(C_4H_9)_3P=N]_2\underset{\underset{C_2H_5}{|}}{Si}-C_6H_4-\underset{\underset{C_2H_5}{|}}{Si}[N=P(C_4H_9)_3]_2$$

The phosphoranes, arsanes, and stibanes of the above examples are useful as fillers for plastic and polymeric materials to impart fire retardant properties thereto, as illustrated by the following example.

*Example XX.* — Diphenylsilyldi(imidotriphenylphosphorane) (2 g.) is dissolved in isopropyl alcohol and mixed with 20 g. of an epoxy resin having a melting point of 8–12° C., an epoxide equivalency of 190 to 210 and a viscosity of Z–5 to Z–6 on the Gardner-Holdt scale. After thorough mixing, the solvent is removed by warming the resin mixture to 70° at 2 mm. The mixture is then cooled to room temperature and 2 g. of diethylenetriamine is added. The mixture is thoroughly blended and deaerated under 2 mm. pressure. The resin is cast into a ⅛-inch thick panel and cured for one hour at 80° C.

A similar panel is prepared in the same way, but without diphenylsilyldi(imidotriphenylphosphorane) for use as a standard.

When 4 in. x ½ in. strips are compared in standard burning tests, the strip containing the phosphorane does not support combustion whereas, the untreated strip burns readily.

In addition, the phosphoranes, arsanes, and stibanes are useful in stabilizing materials against deterioration caused by ultraviolet light. Thus, a polymeric material or resin, such as a polyester, vinyl, epoxy, or like resin, which normally yellows as the result of exposure to ultraviolet light, retains its desirable color when a phosphorane, arsane, or stibane is incorporated therein.

In addition to the monomeric phosphorane, arsane, and stibane compounds, new and useful polymeric phosphoranes, arsanes, and stibanes can be prepared. Depending on the choice of reactants, products can be prepared which are useful as hydraulic fluids, transformer oils, lubricating oils and greases, and the like.

Polymeric phosphoranes, arsanes, and stibanes are also useful in conjunction with known oils, lubricants and the like because they impart thermal, oxidative and ultraviolet light stability. High molecular weight polymeric phosphoranes, arsanes and stibanes provide oxidatively, thermally, and hydrolytically stable polymers which can be drawn into fibers, fabricated into film and sheet laminates, or incorporated in varnishes for use as surface coatings.

Depending upon the nature of the starting materials, the polymeric phosphoranes, arsanes, and stibanes are linear, two dimensional cross-linked or three dimensional cross-linked polymers. Since the polymeric materials are derived from silicon, germanium, or tin polyazides there are two different classes of polymeric phosphoranes, arsanes, and stibanes. The first class is derived from silicon, germanium or tin azides in which there is more than one azide group on the phosphorus atom. This class is illustrated by Formulae IV and V;

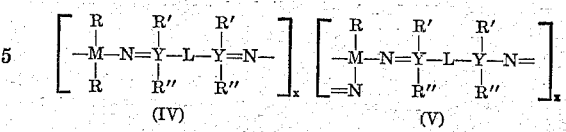

Formula IV represents a linear polymer and Formula V represents a cross-linked polymer.

The second class of polymeric phosphoranes, arsanes and stibanes derived from silicon, germanium, or tin azides is obtained when two silicon, germanium, or tin azide groups attached to an organic group.

This second class of polymeric materials is illustrated by Formulae VI and VII;

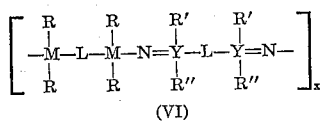

(VI)

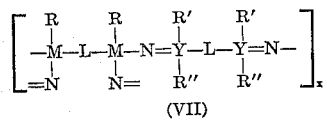

(VII)

Formula VI represents a linear polymer and Formula VII represents a cross-linked polymer.

Examples of the preparation of linear and cross-linked polymeric phosphoranes, arsanes, and stibanes derived from silicon, germanium and tin azides are set forth in Examples XXI—XXV.

*Example XXI.*—One mole of 1,4-bis-(dimethylphosphino)benzene and one mole of 1,4-bis-(dimethylazidosilano)benzene are slowly mixed in xylene and heated until the evolution of nitrogen ceases. The xylene solution of the resulting polymer can be used as such, or the xylene can be removed by evaporation leaving the product,

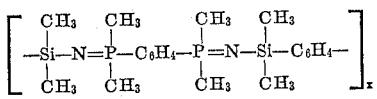

*Example XXII.*—One mole of diphenyldiazidogermane and one mole 1,3-bis-(diphenylarsino)benzene are slowly mixed and heated in pyridine until the evolution of nitrogen is complete. The resulting pyridine-polymer mixture can be used as such or the pyridine can be removed by distillation leaving the product,

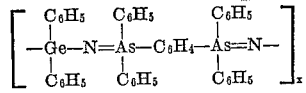

*Example XXIII.*—One mole of diphenyldiazidosilane and one mole of 1,3-bis-(dimethylstibino)benzene are slowly mixed in pyridine and heated until the evolution of nitrogen is complete. The resulting pyridine-polymer mixture can be used as such, or the pyridine can be removed by distillation, leaving the product,

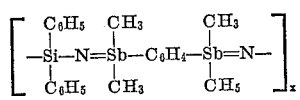

*Example XXIV.*—A cross-linked polymer is prepared by heating a pyridine solution containing one mole of 4,4′-bis-(methyldiazidostannano)diphenyl ether and one mole of 4,4′-bis(diethylphosphino)biphenyl until the evolution of nitrogen is complete. The resulting pyridine-polymer mixture can be used as such or the polymer can be isolated by removing the pyridine therefrom by distillation.

*Example XXV.*—A polymer is prepared by heating a pyridine solution containing one mole of bis-(dimethylamino)dichlorosilane, two moles of sodium azide, and one mole of 1,4-bis[bis(dimethylamino)phosphino]benzene until the evolution of nitrogen is complete. The polymeric product is isolated by filtration and evaporation of the solvent, leaving the product,

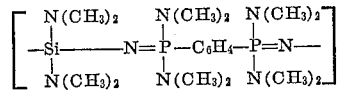

While the present invention has been described with respect to what at present are preferred embodiments thereof, it will be understood, of course, that certain changes, substitutions, modifications and the like may be made therein without departing from its true scope as defined in the appended claims.

What is claimed is:

1. A process for the preparation of a new class of polymers which comprises reacting under anhydrous conditions,
    (a) one mole of a compound leaving the formula

where R is selected from the group consisting of aryl, alkyl, halogen, alkoxy, aryloxy, amino, alkylthio, and arylthio groups;
    M is a metal selected from the group consisting of silicon, germanium, and tin; and
    $n$ is a whole number from 2 to 4; with
    (b) from 1 to 2 moles of a compound having the formula

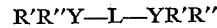

wherein Y is selected from the group consisting of phosphorus, arsenic, and antimony; and R′ and R″ are selected from at least one of the group consisting of aryl, alkyl, alkoxy, aryloxy, amino, alkylthio, and arylthio groups; and
    L is a group selected from the groups consisting of alkylene and arylene.

2. A process for the preparation of a new class of polymers which comprises reacting under anhydrous conditions,
    (a) one mole of a compound having the formula

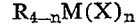

where R is selected from the group consisting of aryl, alkyl, alkoxy, aryloxy, amino, alkylthio, and arylthio groups;
    M is a metal selected from the group consisting of silicon, germanium, and tin;
    X is halogen; and
    $n$ is a whole number from 2 to 4; with
    (b) from 2 to 4 moles of a compound having the formula

where M′ is a metal selected from the group consisting of alkali and alkaline earth metals; with
    (c) from 1 to 2 moles of a compound having the formula

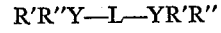

wherein Y is selected from the group consisting of phosphorus, arsenic, and antimony; and R′ and R″ are selected from at least one of the group consisting of aryl, alkyl, alkoxy, aryloxy, amino, alkylthio, and arylthio groups; and
    L is a group selected from the groups consisting of alkylene and arylene.

3. As new compositions of matter, polymeric materials having the general formula

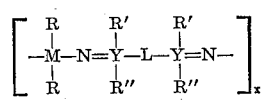

where R is selected from the group consisting of aryl, alkyl, halogen, alkoxy, aryloxy, amino, alkylthio, arylthio, and azide groups;

M is a metal selected from the group consisting of silicon, germanium, and tin;

Y is selected from the group consisting of phosphorus, arsenic and antimony;

R' and R'' are selected from at least one of the group consisting of aryl, alkyl, alkoxy, aryloxy, amino, alkylthio and arylthio groups;

L is an organic group selected from the alkylene and arylene groups; and

X indicates the polymeric nature of the material.

4. A polymer,

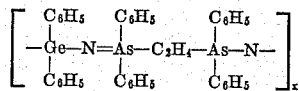

wherein $x$ indicates the polymeric nature of the material.

5. A polymer,

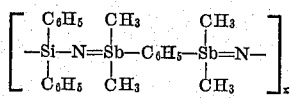

wherein $x$ indicates the polymeric nature of the material.

6. A polymer,

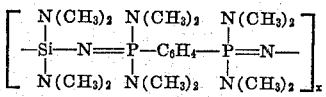

wherein $x$ indicates the polymeric nature of the material.

References Cited

UNITED STATES PATENTS 3,189,564   6/1965   Washburn et al. _____ 260—2

SAMUEL H. BLECH, *Primary Examiner.*